(12) United States Patent
Mitani et al.

(10) Patent No.: US 7,443,620 B2
(45) Date of Patent: Oct. 28, 2008

(54) LENS BARREL UNIT AND IMAGING APPARATUS

(75) Inventors: Yoshifumi Mitani, Osaka (JP); Naohiko Hayashi, Matsubara (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 376 days.

(21) Appl. No.: 11/274,373

(22) Filed: Nov. 14, 2005

(65) Prior Publication Data
US 2007/0019100 A1 Jan. 25, 2007

(30) Foreign Application Priority Data
Jul. 8, 2005 (JP) .............................. 2005-199752

(51) Int. Cl.
*G02B 7/02* (2006.01)
(52) U.S. Cl. ........................ 359/822; 359/824; 359/823; 359/811; 359/815
(58) Field of Classification Search ................. 359/813, 359/811, 822, 824, 823, 818, 815
See application file for complete search history.

(56) References Cited

U.S. PATENT DOCUMENTS 6,650,488 B2 * 11/2003 Onda ......................... 359/823

(Continued)

FOREIGN PATENT DOCUMENTS

JP     A 63-239430     10/1988

(Continued)

OTHER PUBLICATIONS

Notification of Reason for Refusal in Japanese Patent Application No. 2005-199752, dated Jul. 10, 2007, with English translation, 7 pages.

*Primary Examiner*—Scott J. Sugarman
*Assistant Examiner*—Brandi N Thomas
(74) *Attorney, Agent, or Firm*—Brinks Hofer Gilson & Lione

(57) ABSTRACT

There are provided a lens barrel unit and an imaging apparatus in which a plurality of constituent elements can be driven using a linear driving mechanism. The lens barrel unit 6 comprises: an actuator 31 for positioning a driving member 40 that is linearly movable along a driving shaft 39; a movably supported first moving member 33 that is linked to a lens 13; a movably supported second moving member 36; a first force-applying member 34 that applies a force to the first moving member 33 in a direction to cause the first moving member 33 to contact the driving member 40, thus causing the first moving member 33 to follow linear movement of the driving member 40; a first restricting member 70 that limits movement of the first moving member 33, thus isolating the first moving member 33 from the driving member 40; a second force-applying member 37 that applies a force to the second moving member 36 in a direction to cause the second moving member 36 to contact the driving member 40, thus causing the second moving member 33 to follow linear movement of the driving member 40; and a second restricting member 28a that limits movement of the second moving member 36, thus isolating the second moving member 33 from the driving member 40, wherein the direction of the force applied by the first force-applying member 34 and the direction of the force applied by the second force-applying member 37 are opposite.

10 Claims, 17 Drawing Sheets

U.S. PATENT DOCUMENTS

| | | | |
|---|---|---|---|
| 2004/0036798 A1* | 2/2004 | Saito et al. | 348/363 |
| 2005/0013016 A1* | 1/2005 | Nakatani et al. | 359/689 |

FOREIGN PATENT DOCUMENTS

| | | |
|---|---|---|
| JP | A 05-011310 | 1/1993 |
| JP | A 2001-109045 | 4/2001 |
| JP | A 2002-296480 | 10/2002 |
| JP | A 2004-304827 | 10/2004 |
| JP | 2004-341287 | 12/2004 |
| JP | 2005-043733 | 2/2005 |
| JP | 2005-128335 | 5/2005 |

* cited by examiner

LENS BARREL UNIT AND IMAGING APPARATUS

This application is based on application No. 2005-199752 filed in Japan, the contents of which is hereby incorporated by reference.

BACKGROUND OF THE INVENTION

1. Field of the Invention

The present invention relates to a lens barrel unit and an imaging apparatus.

2. Description of the Related Art

In general, in a lens barrel unit or imaging apparatus, a plurality of constituent elements must be driven to move lenses for zooming and focusing, to open/close a lens barrier that protects an objective lens, and so on. The timing of operation and the amount moved vary for each constituent element.

Conventionally, there has been publicly known a driving mechanism in which a plurality of cams are provided on a single rotating member so that the plurality of constituent elements can each be driven with a prescribed timing and by a prescribed movement amount. However, in such a mechanism using cams, there has been a problem that to make the movement amount large, a large cam must be used.

For example, Japanese Patent Application Laid-open No. 2005-128335 discloses a lens barrel unit having a driving mechanism in which a groove for opening/closing a lens barrier is provided on a cam ring having a cam groove for driving a lens. However, in the mechanism of above publication, the projected area in the direction of the optical axis becomes large, and hence this mechanism is not suitable for making the lens barrel unit small; in particular, this mechanism does not contribute to making a bending optical system that bends the optical axis through approximately 90° thin.

Hitherto, in small lens barrel units linear driving mechanisms such as screw feed mechanisms and piezoelectric actuators according to which a driving member is moved in a straight line along a driving shaft have been widely used for driving lenses and so on.

However, in such linear driving mechanisms, there has been a problem that only one linear movement can be produced, and hence it is not possible to drive a plurality of constituent elements with different timings.

SUMMARY OF THE INVENTION

In view of the problems described above, it is an object of the present invention to provide a lens barrel unit and imaging apparatus according to which a plurality of constituent elements can be driven using a linear driving mechanism.

To attain this object, a lens barrel unit according to the present invention has: an actuator for positioning a driving member that is linearly movable along a driving shaft; a first moving member which is movably supported and linked to a lens; a second moving member which is movably supported; a first force-applying member that applies a force to the first moving member in a direction so as to cause the first moving member to contact the driving member, thus causing the first moving member to follow linear movement of the driving member; a first restricting member that contacts the first moving member, thus limiting movement of the first moving member in the direction of the force applied by the first force-applying member, and hence isolating the first moving member from the driving member; a second force-applying member that applies a force to the second moving member in a direction so as to cause the second moving member to contact the driving member, thus causing the second moving member to follow linear movement of the driving member; and a second restricting member that contacts the second moving member, thus limiting movement of the second moving member in the direction of the force applied by the second force-applying member, and hence isolating the second moving member from the driving member; wherein the direction of the force applied by the first force-applying member and the direction of the force applied by the second force-applying member are opposite relative to the driving member.

According to this constitution, the driving member is positioned using a single actuator. The first moving member is caused to follow linear movement of the driving member by the first force-applying member, and furthermore within a prescribed range of the driving member, the first moving member is detached from the movement of the driving member by the first restricting member and thus stopped. Moreover, the second moving member is caused to follow linear movement of the driving member by the second force-applying member, and furthermore the second moving member is detached from the movement of the driving member by the second restricting member. That is, while the first moving member is following the driving member, the second moving member can be detached from the movement of the driving member and stopped, and hence the timings of driving the first moving member and the second moving member can be set freely. As a result, the first moving member and the second moving member can be driven with different timings using the same linear driving mechanism (actuator), and hence the lens barrel unit can be made small in size.

Moreover, in the lens barrel unit of the present invention, it may be made to be such that the first restricting member and the second restricting member restrict respectively the first moving member and the second moving member such that the first moving member and the second moving member do not simultaneously contact the driving member. As a result, in the case that changing between an imaging state and a non-imaging state is carried out using the second moving member, there is no needless lens movement when not taking an image, and hence the lens barrel unit can be made small in size.

Moreover, if the lens barrel unit of the present invention has a first sliding shaft that guides the first moving member parallel to the driving shaft, then lens movement becomes smoother.

Moreover, in the lens barrel unit of the present invention, it may be made to be such that the driving shaft is a rotatable driving screw having a screw thread provided at a periphery thereof, the driving member has an internal screw thread that engages with the driving screw, and the actuator comprises a motor that rotates the driving screw. As a result, the first moving member and the second moving member can be driven with different timings using an actuator comprising a screw feed mechanism.

Moreover, in the lens barrel unit of the present invention, it may be made to be such that the actuator comprises an electromechanical converter that extends/contracts so as to cause the driving shaft to move in an axial direction, and the driving member engages through friction with the driving shaft so as to move together with the driving shaft when the driving shaft moves gradually and slide over the driving shaft when the driving shaft moves suddenly. As a result, a piezoelectric actuator can be formed enabling the first moving member and the second moving member to be driven with different timings.

Moreover, the lens barrel unit of the present invention may have position detecting means for detecting the position of at least one of the driving member, the first moving member and the second moving member. As a result, the first moving member and the second moving member can be positioned precisely.

Moreover, the lens barrel unit of the present invention may have an optical member that bends an optical axis substantially 90°. As a result, a small, thin lens barrel unit with a bending optical system can be provided.

Moreover, an imaging apparatus having the lens barrel unit of the present invention can be made small in size.

Moreover, in the imaging apparatus of the present invention, it may be made to be such that the first moving member contacts the driving member when taking an image, and the first moving member is isolated from the driving member when not taking an image. As a result, space for needless lens movement when not taking an image is not taken up, and hence the imaging apparatus does not become large.

Moreover, in the imaging apparatus of the present invention, it may be made to be such that the second moving member moves a lens barrier. As a result, there is no need to provide a driving source exclusively for driving the lens barrier.

According to the present invention, each moving member is pushed against the driving member using a force-applying member so as to cause the moving member to follow linear movement of the driving member, and moreover the movement of each moving member is restricted using a restricting member so as to detach the moving member from the linear movement of the driving member and thus stop the moving member, whereby a plurality of moving members can be driven with different timings using a single driving member. As a result, a plurality of moving members can be driven using a single actuator, and hence the lens barrel unit can be reduced in size and a reduction in cost can be attained.

BRIEF DESCRIPTION OF THE DRAWINGS

Further objects and advantages of the present invention will become clear from the following description taken in conjunction with the preferred embodiments thereof with reference to the accompanying drawings, in which.

DESCRIPTION OF THE PREFERRED EMBODIMENTS

Following is a description of embodiments of the present invention with reference to the drawings.

Figure 1:
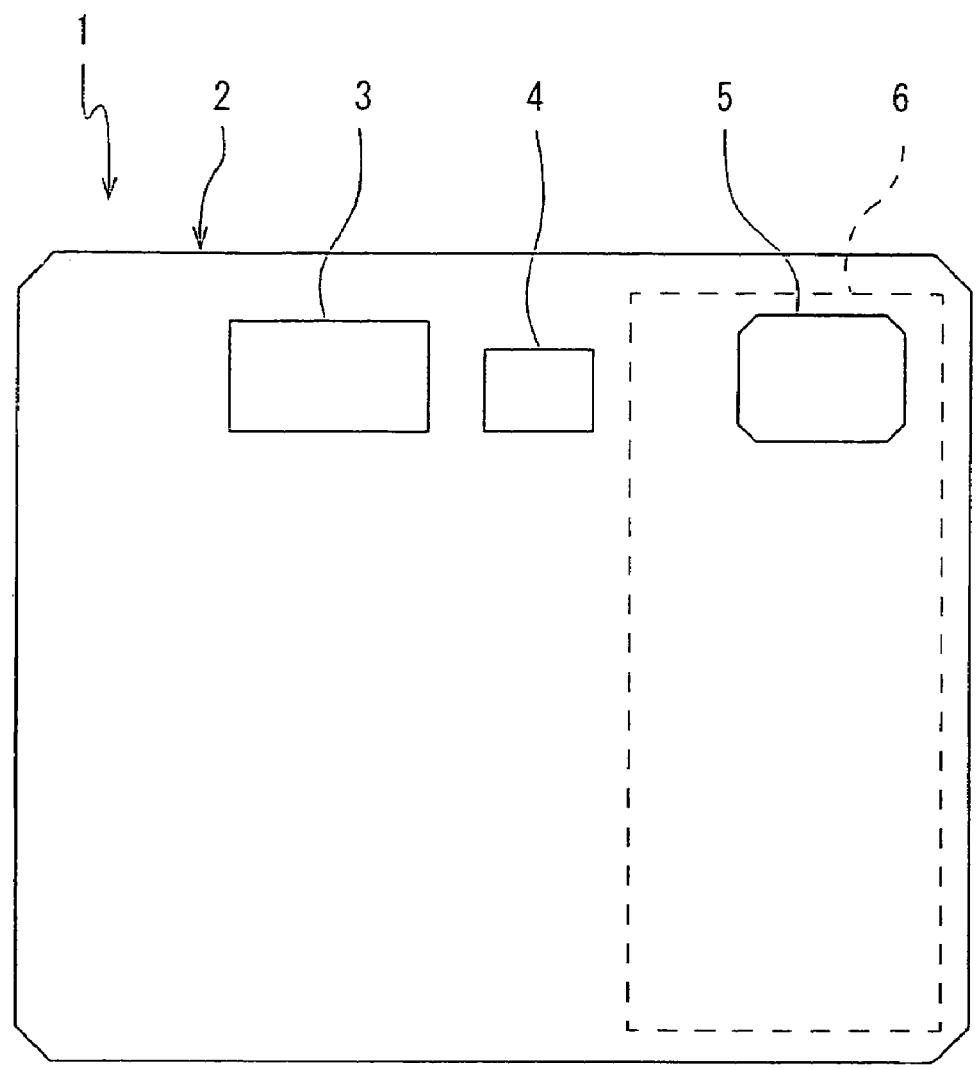
FIG. 1 is a front view of a digital camera according to a first embodiment of the present invention.

FIG. 1 shows a digital camera (imaging apparatus) 1 according to a first embodiment of the present invention. In the digital camera 1, a flash 3, a viewfinder 4, and a lens opening 5 are provided on the front of a main body 2, and a lens barrel unit 6 is provided inside the main body 2 so as to face out onto a photographic subject from the lens opening 5.

Figure 2:
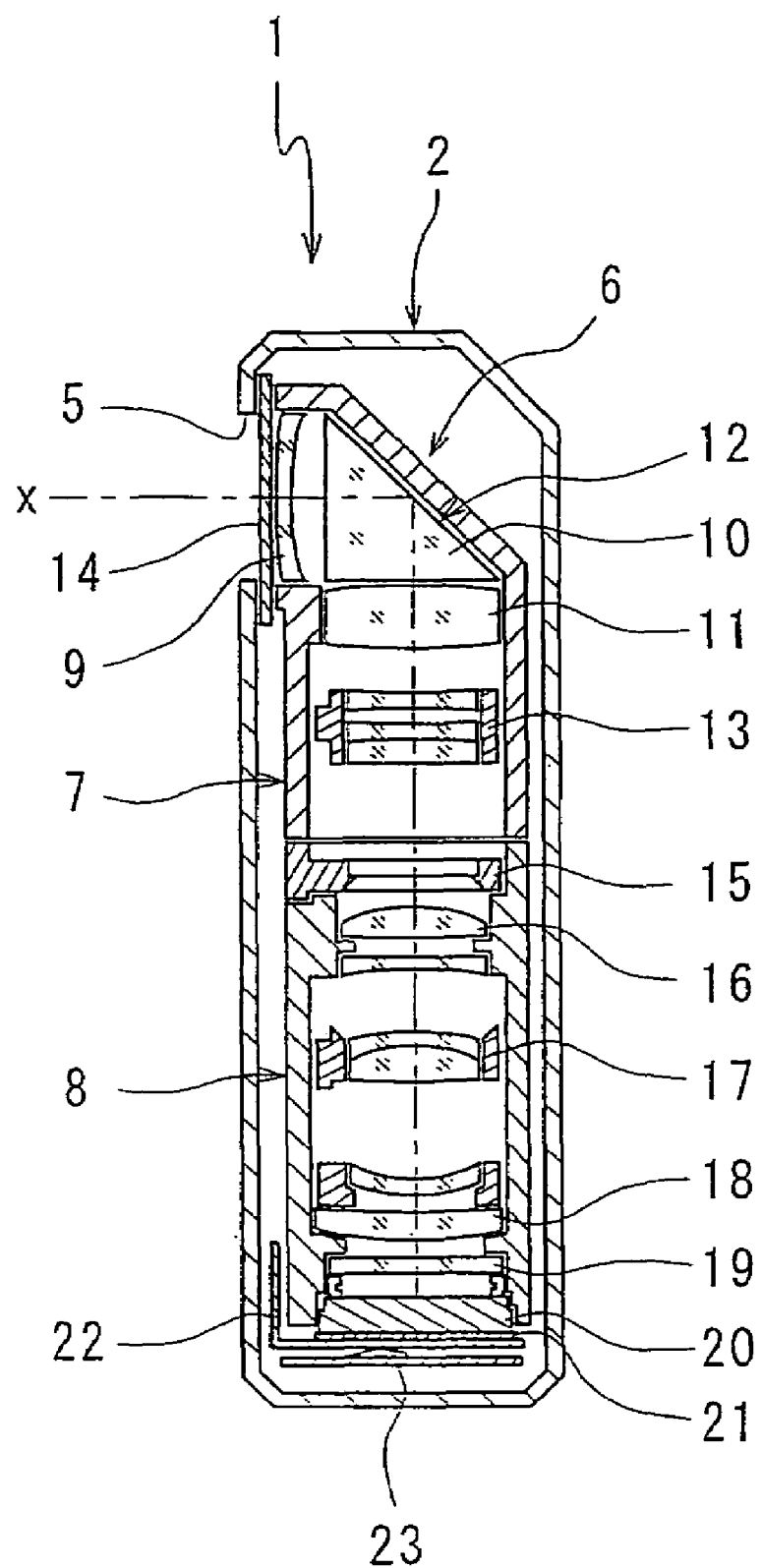
FIG. 2 is a sectional view through the optical axis of the digital camera of FIG. 1.

FIG. 2 is a vertical sectional view through the lens barrel unit 6 of the digital camera 1. The lens barrel unit 6 forms a bending optical system that bends the optical axis x of light entering from the photographic subject through 90°, and comprises a single body a first lens barrel 7 on the photographic subject side (top) and a second lens barrel 8 on the imaging surface side (bottom) which are integrally fixed in the direction of the optical axis x.

The first lens barrel 7 is provided therein with an objective lens 9 that faces out onto the photographic subject from the lens opening 5, a first lens group 12 comprising a prism 10 that bends the light entering from the objective lens 9 through 90° and a fixed lens 11, and a second lens group 13 that comprises a magnification lens that is movable up and down along the optical axis x, and furthermore is provided therein with a lens barrier 14 that closes up the lens opening 5 so as to cover the front of the objective lens 9.

A shutter unit 15 is disposed at an upper end of the second lens barrel 8. The second lens barrel 8 is provided therein with a third lens group 16 onto which light that has passed through the shutter unit 15 enters, a fourth lens group 17 that is movable along the optical axis x within the second lens barrel 8, a fifth lens group 18 provided below the fourth lens group 17, a low pass filter 19 that cuts out a high-frequency component of light that has passed through the fifth lens group 18, and an imaging device 20 having an imaging surface on which is formed an image from the light that has passed through the low pass filter 19. The imaging device 20 is a CCD that converts the image formed on the imaging surface into an electrical signal. A flexible board 21 that is a wiring board wired to the imaging device 20, and a heat-radiating member 22 that takes heat from the imaging device 20 and radiates this heat into the surrounding air are bonded to the imaging device 20. The imaging device 20 is fixed to a lower end of the second lens barrel 8 by a restraining member 23.

Figure 3:
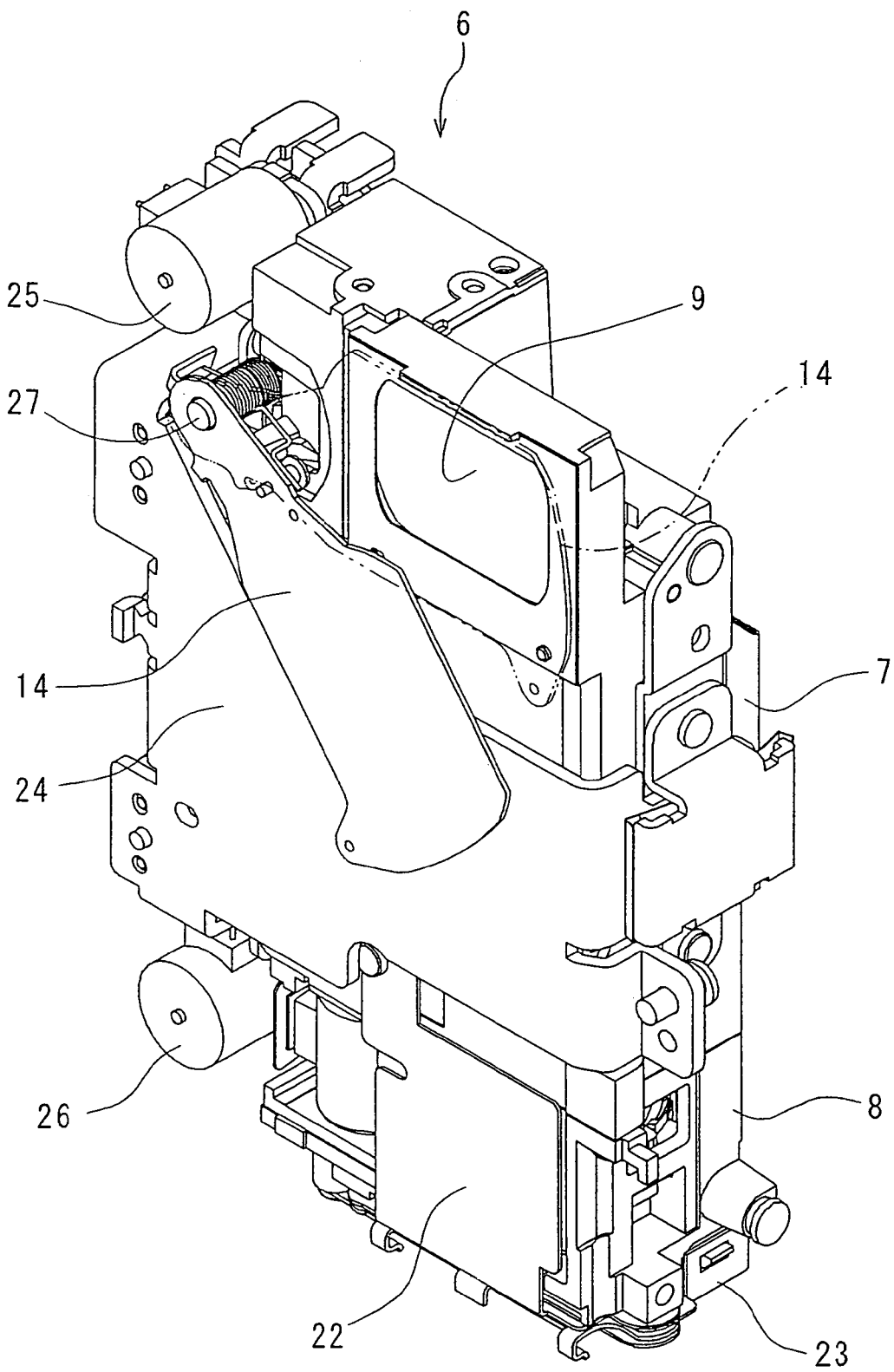
FIG. 3 is a perspective view of a lens barrel unit shown in FIG. 1.

FIG. 3 shows the external appearance of the lens barrel unit 6. The lens barrel unit 6 is attached to a supporting frame 24 such that the attitude of the lens barrel unit 6 can be changed using motors 25 and 26. The lens barrier 14 is pivoted on a pivoting shaft 27, and can be turned so as to cover the front of the objective lens 9.

Figure 4:
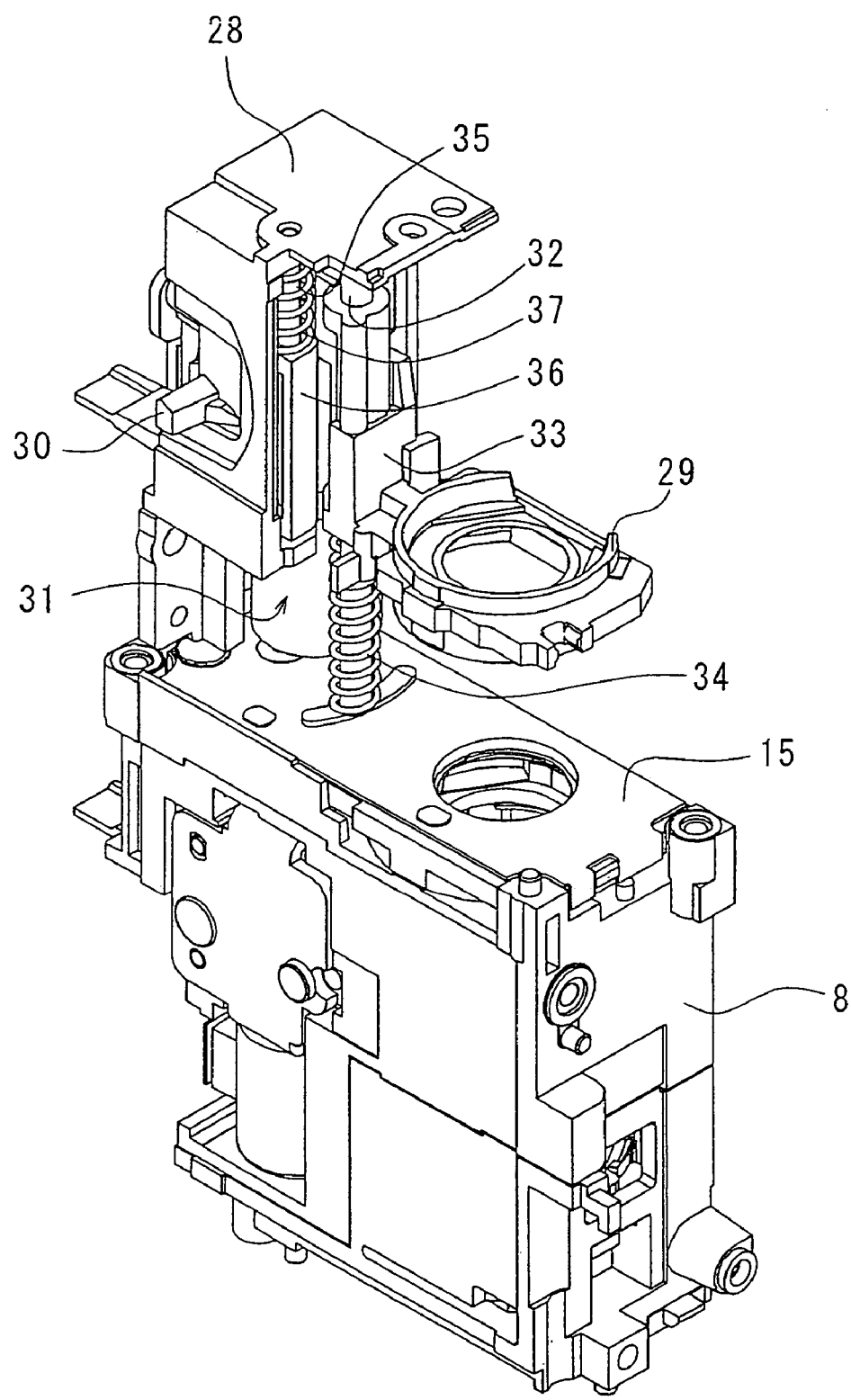
FIG. 4 is a perspective view of part of the lens barrel unit shown in FIG. 3.

FIG. 4 shows the lens barrel unit 6 with the first lens barrel 7 removed. The lens barrel unit 6 is provided, on a frame 28, with a lens frame 29 that holds the second lens group 13, a transmitting member 30 for swinging the lens barrel 14, and an actuator 31 that drives the lens frame 29 and the transmitting member 30. The lens frame 29 is integrated with a first moving member 33 that is slidably supported on a vertical first sliding shaft 32 that is supported on the frame 28, and urged upward by a first force-applying member 34. The transmitting member 30 is integrated with a second moving member 36 that is slidably supported on a second sliding shaft 35 that is supported on the frame 28, and urged downward by a second force-applying member 37.

Figure 5:
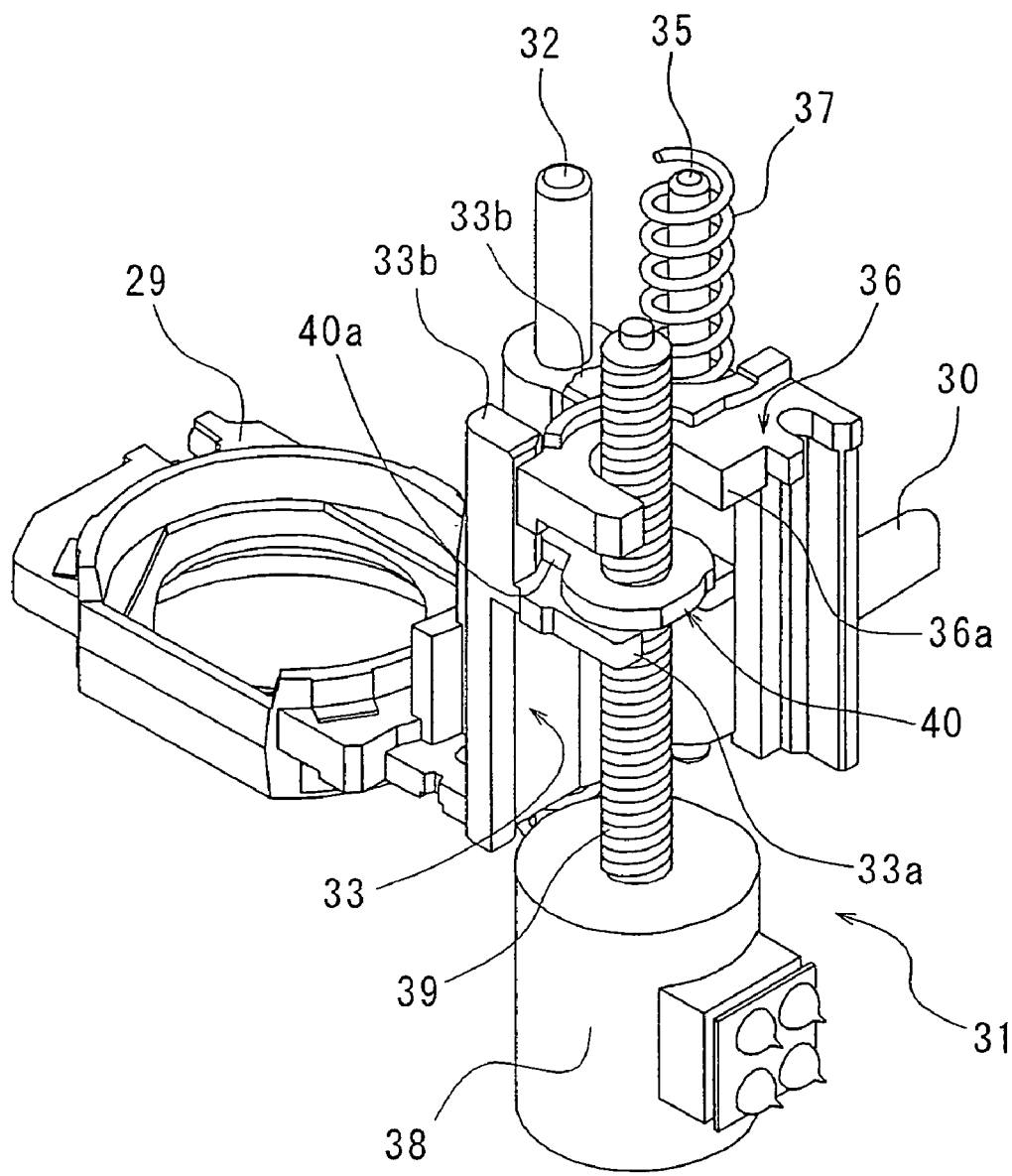
FIG. 5 is a perspective view of part of a driving apparatus shown in FIG. 4.

FIG. 5 shows the driving mechanism for the first moving member 33 and the second moving member 36, shown viewed from the rear and removed from the frame 28. The actuator 31 comprises a driving motor 38, a feed screw (driving shaft) 39 that is an output shaft of the driving motor 38, and a driving member 40 that has a projecting portion 40a and is provided therein with an internal screw thread that engages with the feed screw 39. The feed screw 39 is parallel to the first sliding shaft 32 which guides the first moving member 33, and the second sliding shaft 35 which guides the second moving member 36. The first moving member 33 is provided thereon with a U-shaped first contacting piece 33a that projects out below the driving member 40 so as to surround the feed screw 39, and guiding portions 33b that sandwich the projecting portion 40a of the driving member 40 therebetween and thus guide the projecting portion 40a such that the driving member 40 does not rotate centered on the feed screw 39. The second moving member 36 is provided thereon with a U-shaped second contacting piece 36a that projects out above the driving member 40 so as to surround the feed screw 39.

Figure 6:
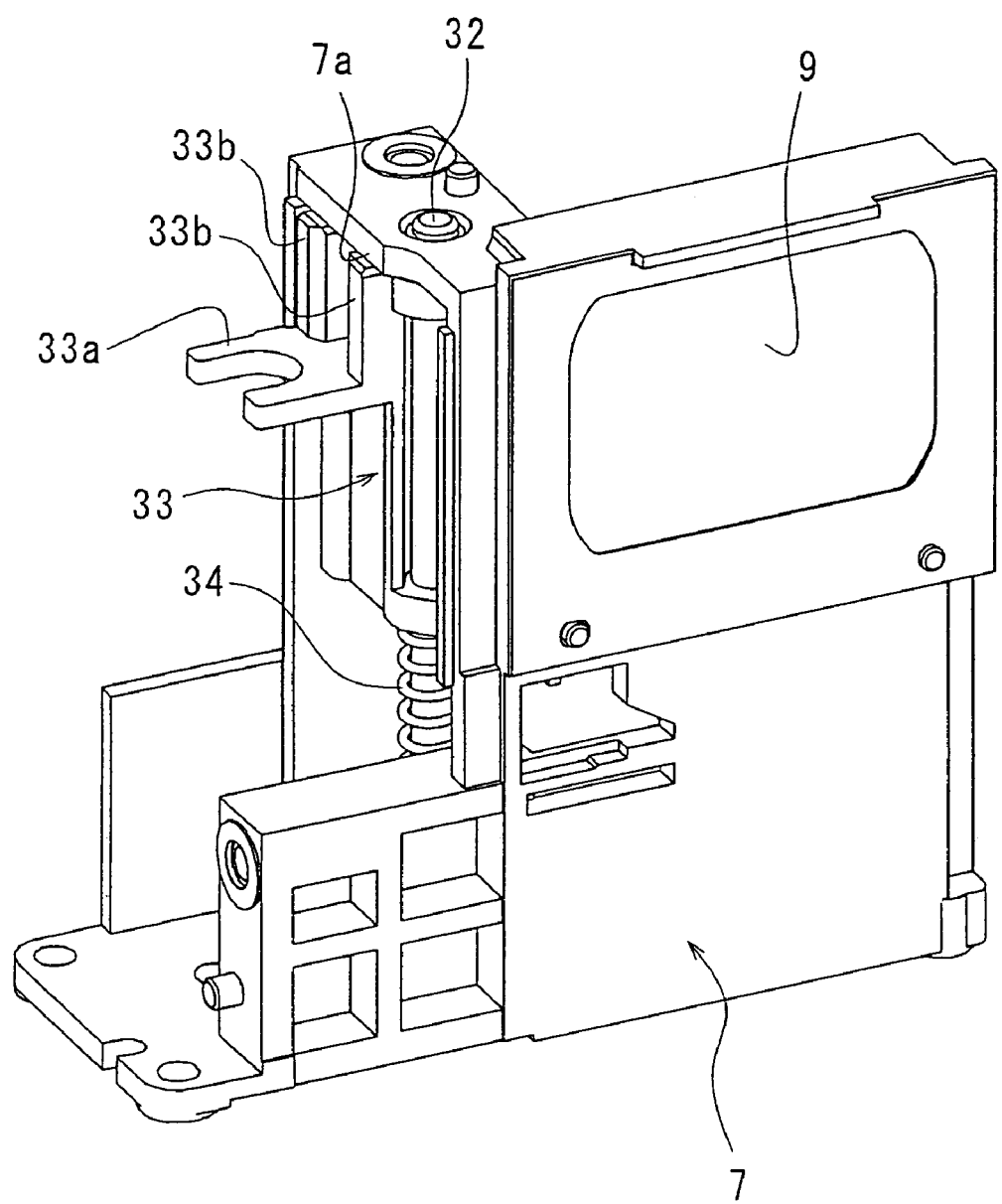
FIG. 6 is a perspective view of a first lens barrel shown in FIG. 3.

As shown in FIG. 6, the first lens barrel 7, which is integrally fixed to the frame 28, holds the first sliding shaft 32. Part of the first lens barrel 7 forms a first restricting member 7a that contacts an upper end of each guiding portion 33b of the first moving member 33, and thus restricts the movement of the first moving member 33 in the direction of the force applied by the first force-applying member 34.

Figure 7:
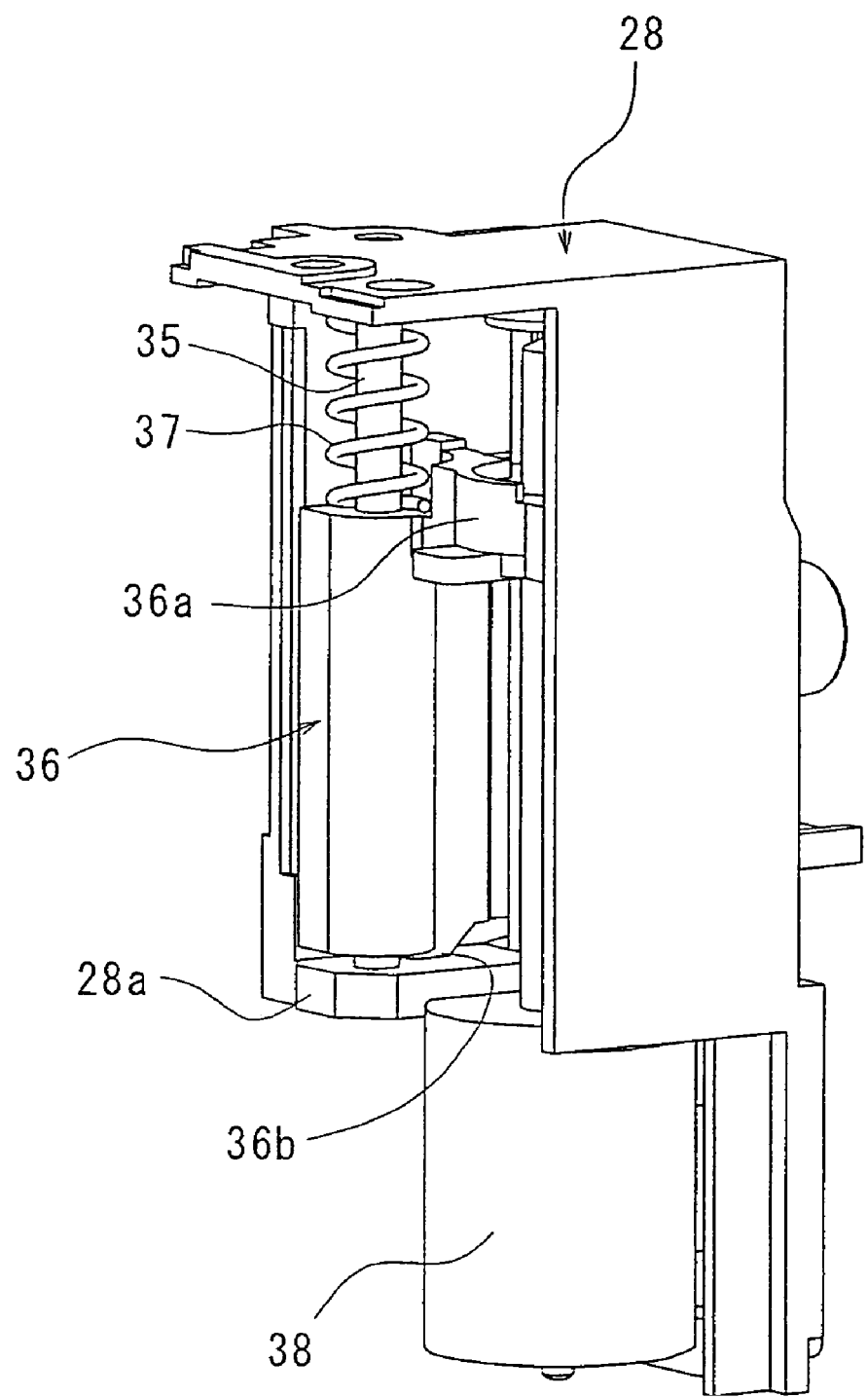
FIG. 7 is a perspective view of a frame shown in FIG. 4.

Moreover, as shown in FIG. 7, part of the frame 28 forms a second restricting member 28a that contacts a contacting portion 36b provided at a lower end of the second moving member 36, and thus restricts the movement of the second moving member 36 in the direction of the force applied by the second force-applying member 37.

A description will now be given of the operation of the lens barrel unit 6 constituted as described above with reference to FIGS. 8 to 13, which show the structure of the lens barrel unit 6 in simplified fashion. In FIGS. 8 to 13, a transmitting pin 14a that is provided on the lens barrier 14 and contacts the transmitting member 30 so that the transmitting member 30 can turn the lens barrier 14, and a position detecting means 41 which is a sensor for detecting the position of the first moving member 33 are also shown.

The first force-applying member 34 applies a force to the first moving member 33 such that the first contacting piece 33a contacts the driving member 40, and the second force-applying member 37 applies a force to the second moving member 36 such that the second contacting piece 36a contacts the driving member 40 from the opposite direction to the first contacting piece 33a.

Figure 8:
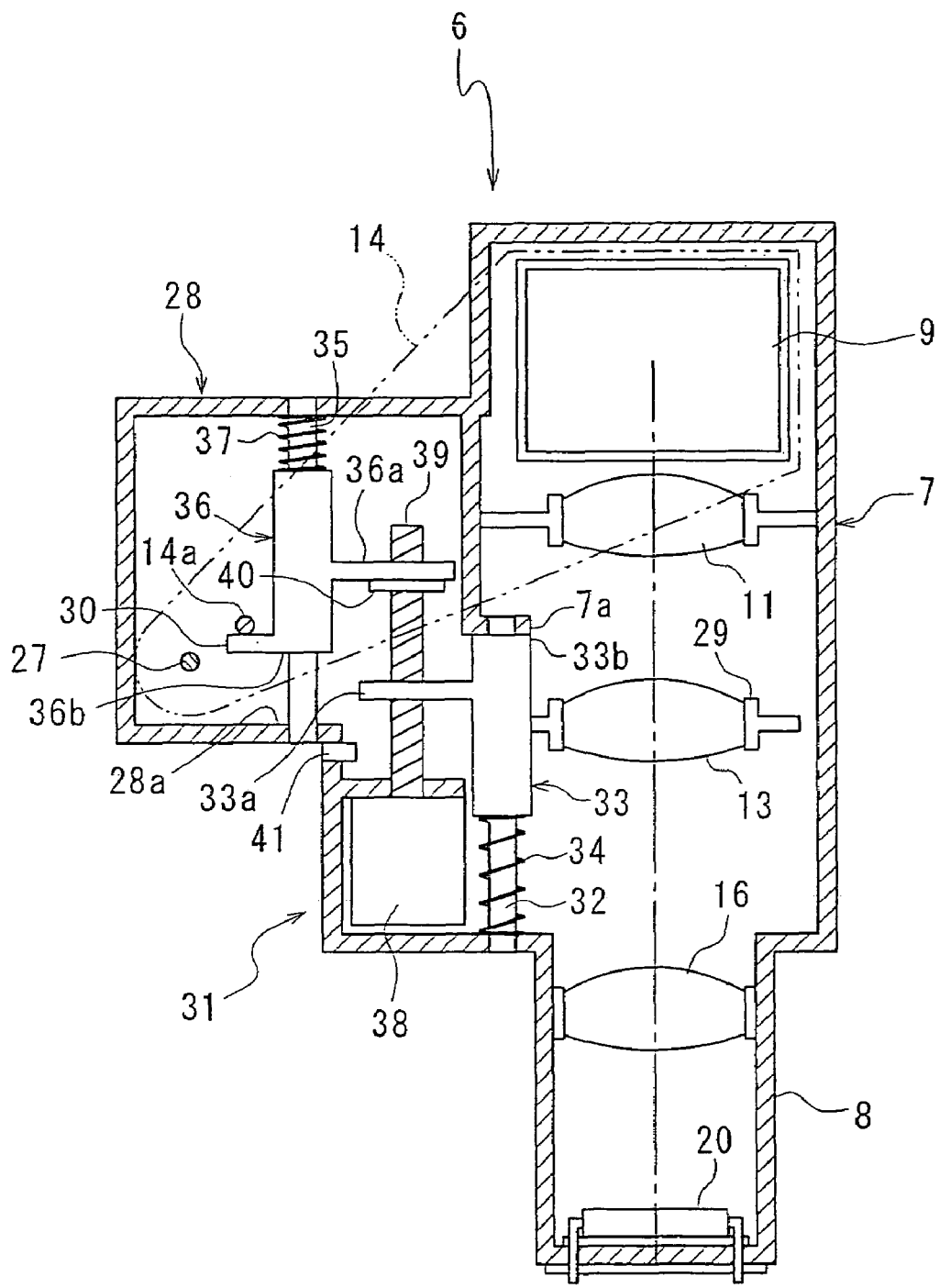
FIG. 8 is a view of the structure of the lens barrel unit shown in FIG. 1 when not taking an image.

FIG. 8 shows the lens barrel unit 6 when not taking an image. The driving member 40 has pushed up the second moving member 36 against the force applied by the second force-applying member 37, and the transmitting member 30 defines the angle of the transmitting pin 14a relative to the pivoting shaft 27 such that the lens barrier 14 is positioned so as to cover the objective lens 9. In this state, movement of the first moving member 33 is restricted by the first restricting member 7a, and hence the first moving member 33 is isolated from the driving member 40. With the first moving member 33 in contact with the first restricting member 7a, the second lens group 13 is positioned at a wide extreme in which the image of the photographic subject is formed smallest on the imaging device 20.

Figure 9:
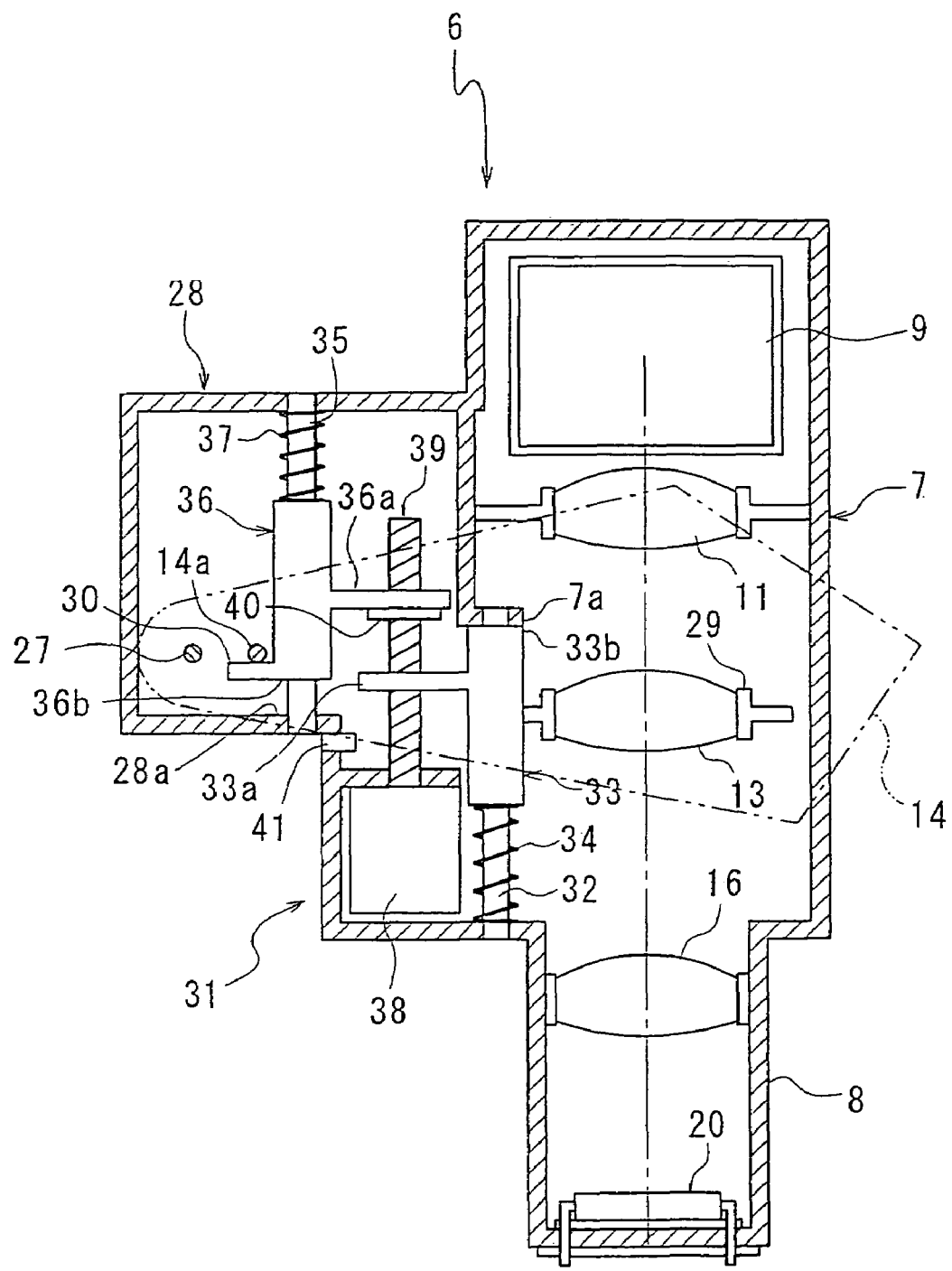
FIG. 9 is a view of the structure of the lens barrel unit shown in FIG. 1 during opening of a lens barrier.

Upon switching the imaging apparatus 1 into imaging mode, as shown in FIG. 9, the driving motor 38 rotates the feed screw 39, thus causing the driving member 40 to descend. The second force-applying member 37 pushes the second moving member 36 against the driving member 40 and thus causes the second moving member 36 to follow the movement of the driving member 40. As a result, the transmitting pin 14a also moves together with the transmitting member 30, and hence turns the lens barrier 14, thus opening up the front of the objective lens 9.

Figure 10:
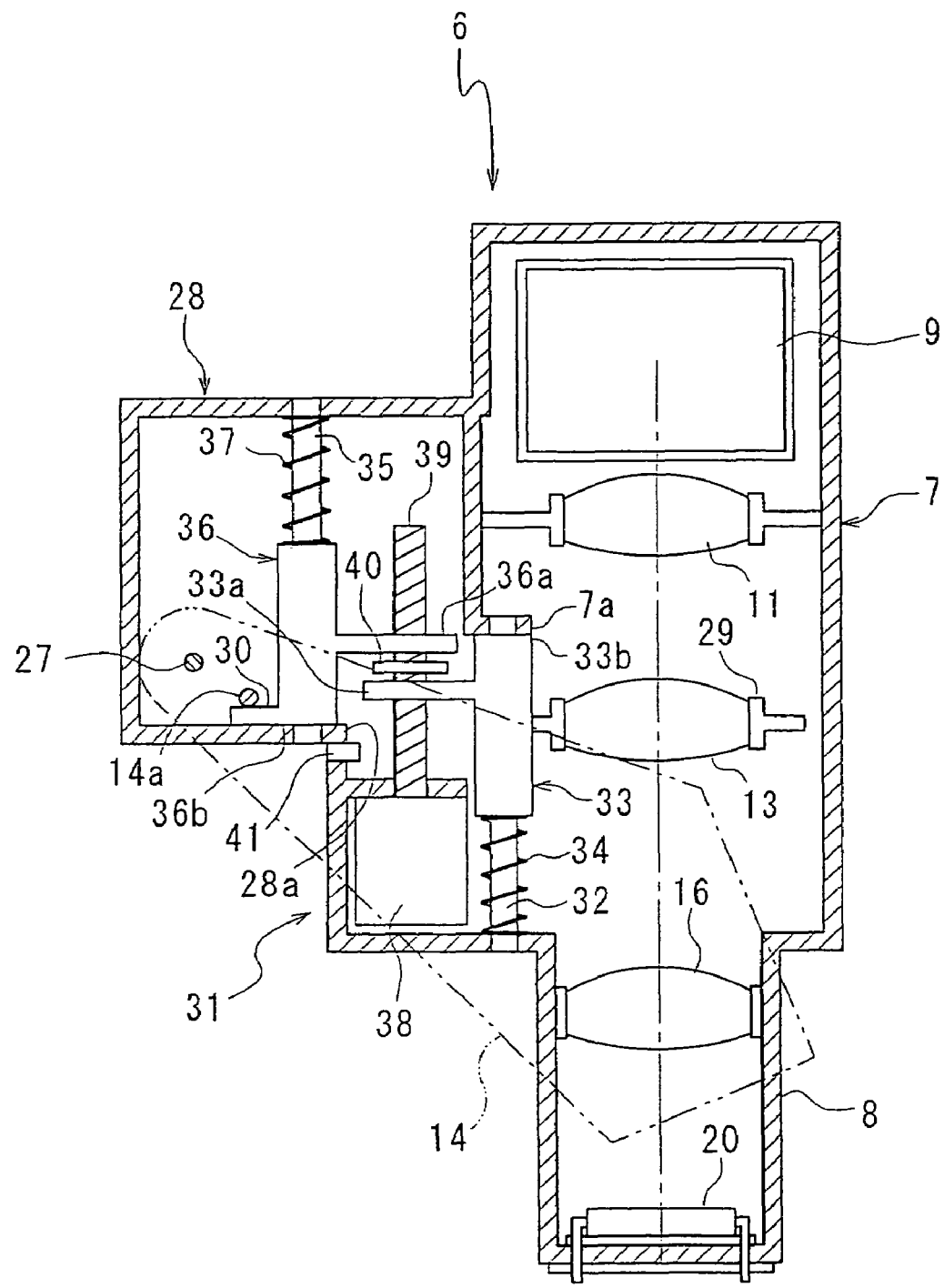
FIG. 10 is a view of the structure of the lens barrel unit shown in FIG. 1 after the opening of the lens barrier has been completed.

As shown in FIG. 10, upon the driving member 40 descending further, after the second moving member 36 has turned the lens barrier 14, the contacting portion 36b contacts the second restricting member 28a. The second moving member 36 then cannot follow the descent of the driving member 40 any further but rather stops there, and hence the second contacting piece 36a is isolated from the driving member 40.

Figure 11:
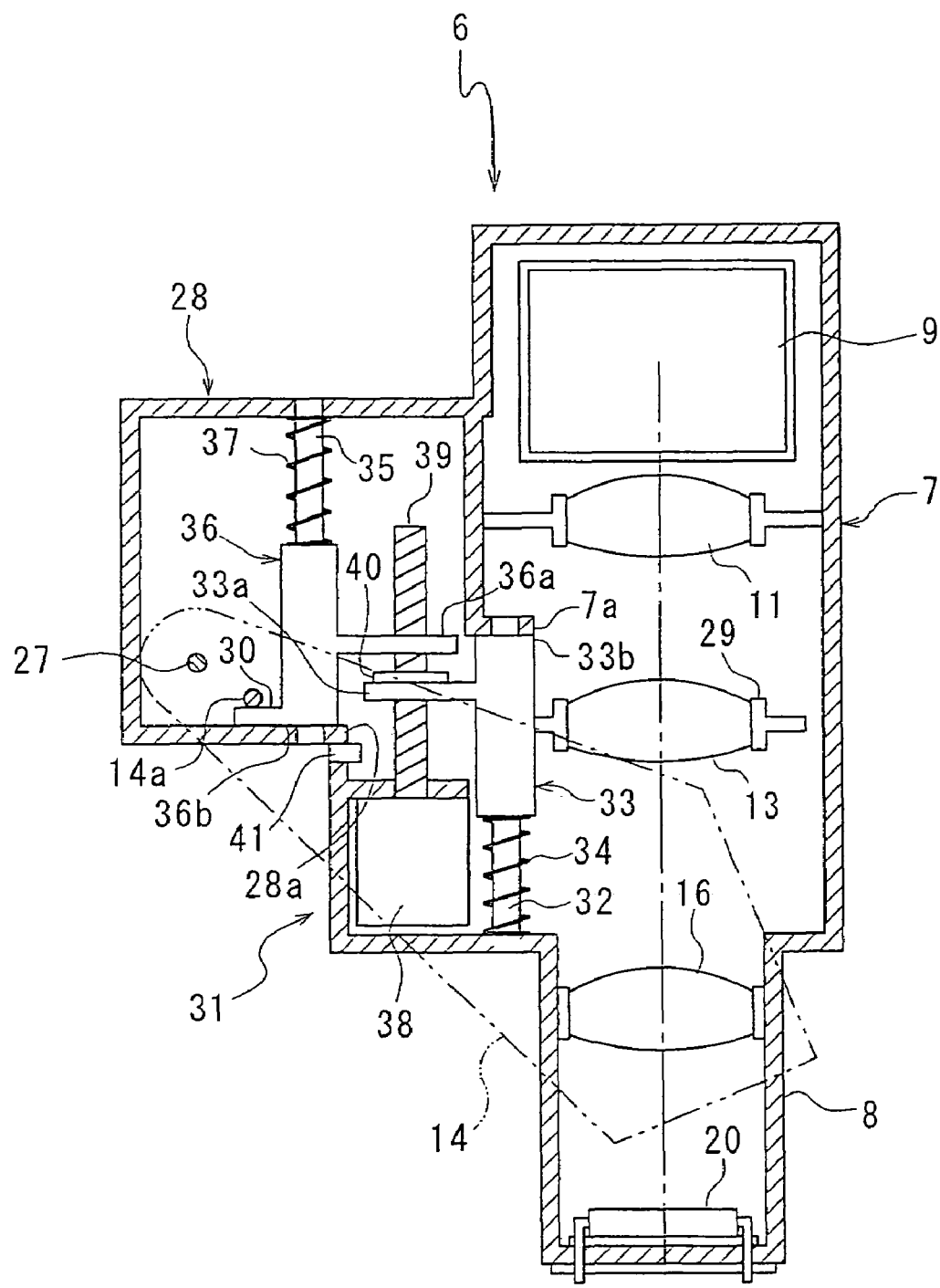
FIG. 11 is a view of the structure of the lens barrel unit shown in FIG. 1 at a wide extreme.

As shown in FIG. 11, upon the driving member 40 descending further, the driving member 40 contacts the first contacting piece 33a of the first moving member 33.

Figure 12:
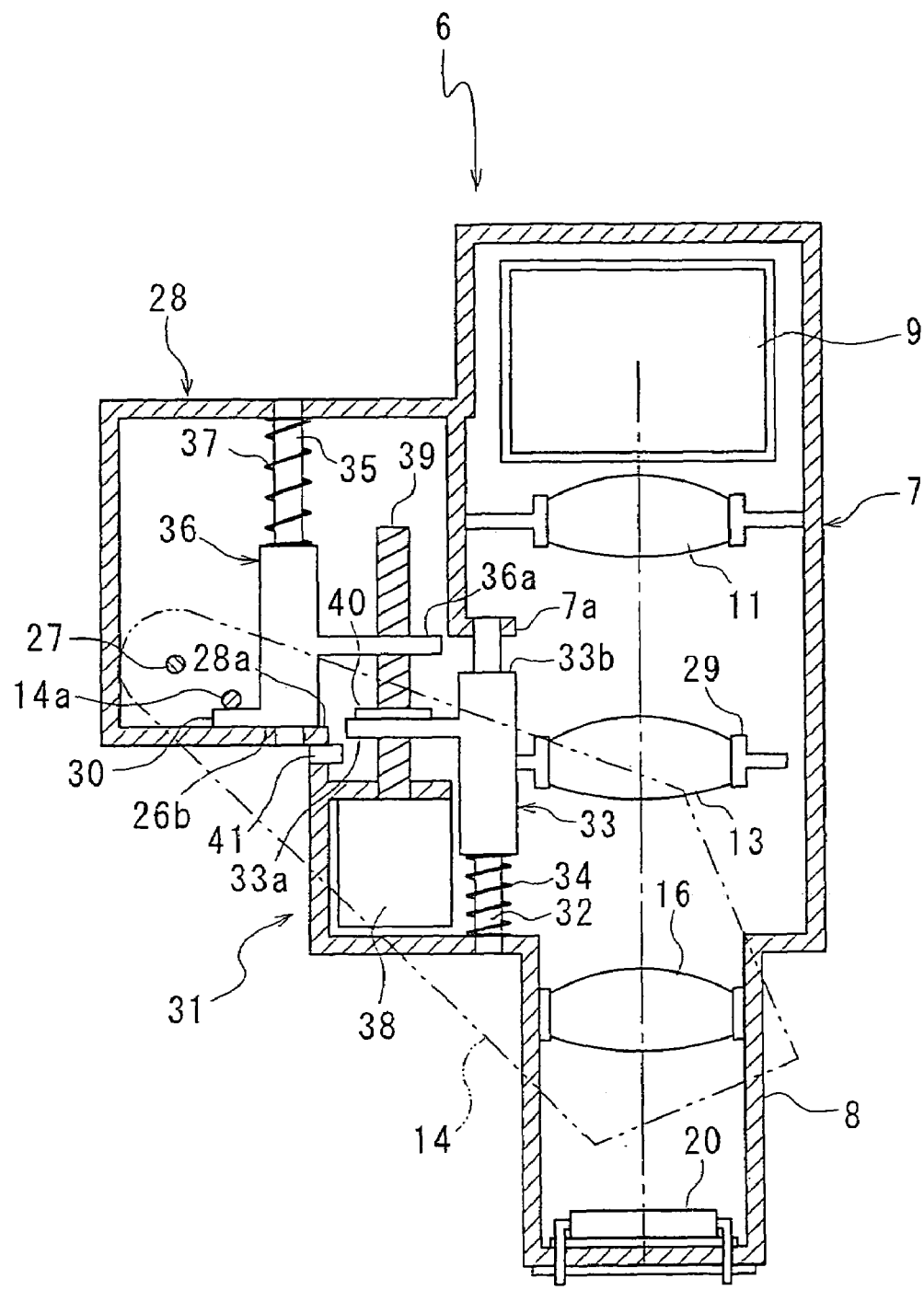
FIG. 12 is a view of the structure of the lens barrel unit shown in FIG. 1 at an intermediate position of a second lens group.

As shown in FIG. 12, the driving member 40 can descend further while pushing the first moving member 33 down against the force applied by the first force-applying member 34. As a result, the second lens group 13 fixed to the lens frame 29 descends, and as the second lens group 13 descends, the image of the photographic subject formed on the imaging device 20 becomes bigger (zooming).

Figure 13:
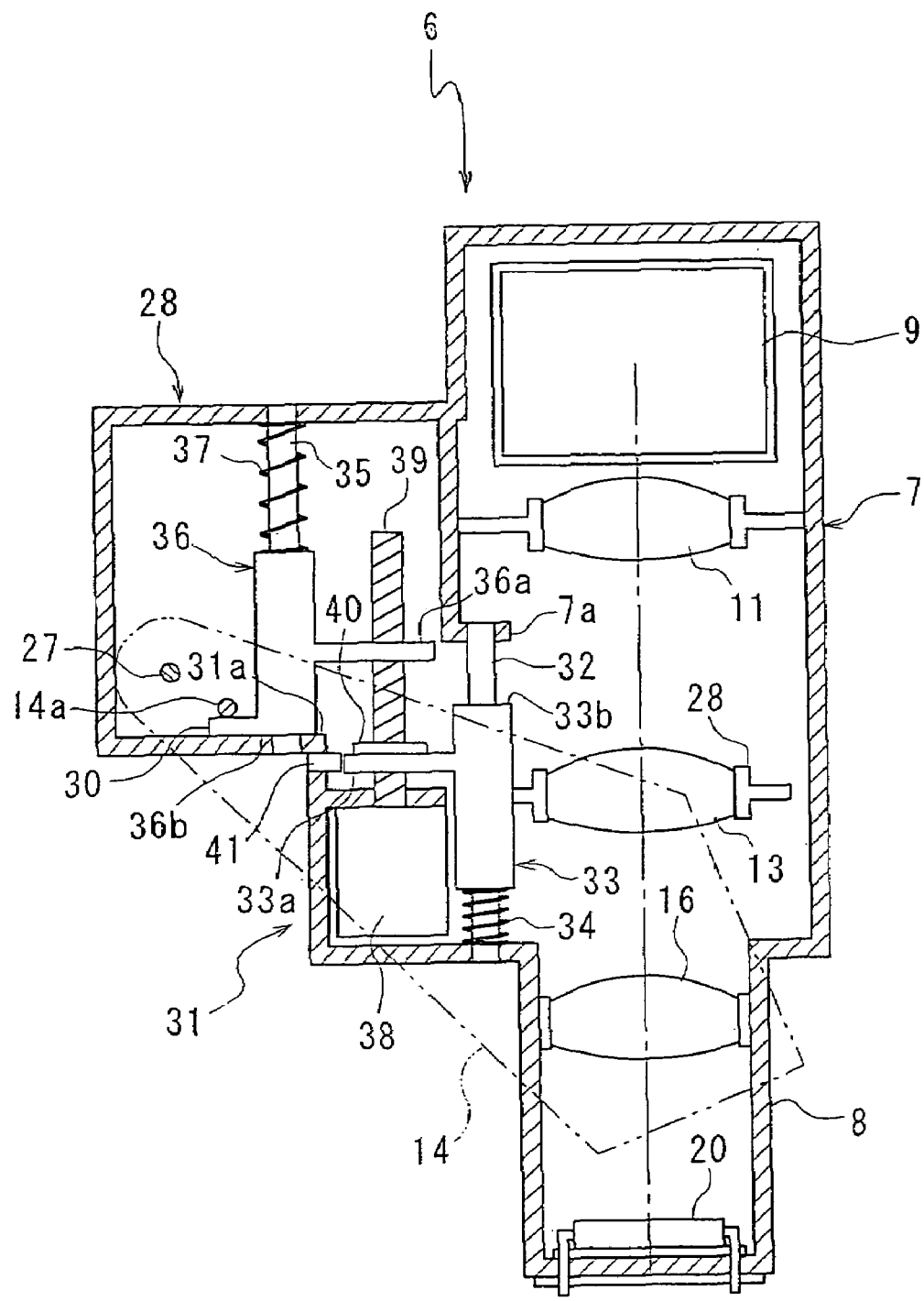
FIG. 13 is a view of the structure of the lens barrel unit shown in FIG. 1 at a telephoto extreme.

As shown in FIG. 13, the driving motor 38 can make the driving member 40 descend until it is detected by the position detecting means 41 that the first moving member has descended as far as a prescribed telephoto extreme.

When taking an image, the driving member 40 moves between the positions in FIGS. 11 to 13. During this movement, the first moving member 33 is pushed against the driving member 40 by the force applied by the first force-applying member 34, and thus follows the up-and-down movement of the driving member 40.

The position of the driving member 40 can be calculated by totaling up the number of revolutions of the driving motor 38 from when the position of the first moving member 33 is detected by the position detecting means 41. The position detecting means 41 may thus detect the first moving member 33 at any position between the wide extreme and the telephoto extreme, and furthermore when commencing taking of an image, setting to a starting point may be carried out by moving the driving member 40 until the position detecting means 41 detects the first moving member 33. Moreover, the position detecting means 41 may also detect the position of the driving member 40 or the second moving member 36.

When imaging mode is ended, the driving member 40 is raised up to the position shown in FIG. 8, whereby the second lens group 13 is returned to the wide extreme, and the lens barrier 14 is turned so as to cover the objective lens 9.

As described above, the actuator 31 in the present embodiment is a linear driving mechanism (screw feed mechanism) comprising the driving motor 38, the feed screw 39, and the driving member 40, and drives two constituent elements, i.e. the lens barrier 14 and the second lens group 13. However, the lens barrier 14 and the second lens group 13 are not driven simultaneously, and each occupies only the minimum required movement space. The lens barrel unit 6 thus does not become large.

Next, the constitution of a lens barrel unit 6' according to a second embodiment of the present invention will be described with reference to FIGS. 14 to 17. Constituent elements the same as ones in the first embodiment will be represented by the same reference numerals as in the first embodiment, and description thereof will be omitted.

The lens barrel unit 6' has a piezoelectric actuator 42 of a publicly known constitution as the driving mechanism. The piezoelectric actuator 42 comprises an weight 43 fixed to the frame 28, a piezoelectric element (electromechanical converter) 44 one end of which is fixed to the spindle 43, a driving shaft 45 fixed to the other end of the piezoelectric element 44, and a driving member 46 that engages through friction with the driving shaft 45. The driving member 46 is slidable along a guiding shaft 47 parallel to the driving shaft 45, and an engaging portion 46a provided projecting out sandwiches the driving shaft 45 together with a plate spring 48, thus engaging through friction with the driving shaft 45. When the driving shaft 45 moves forward/backward rapidly, the driving member 46 slides over the driving shaft 45 and thus stays where it is, whereas when the driving shaft 45 moves forward/backward gradually, the driving member 46 engages through friction with the driving shaft 45 and thus moves together with the driving shaft 45. That is, according to the driving mechanism of the present embodiment, upon the piezoelectric element 44 being extended/contracted at an asymmetric speed, the driving shaft 45 is moved forward/backward at an asymmetric speed, and the driving member 46 is moved with sliding, and is thus moved in a freely chosen direction.

In the lens barrel unit 6', the lens barrier 14 itself is the second moving member, being directly driven by the driving member 46 through the transmitting pin 14a contacting a driving piece 46b of the driving member 46. The lens barrier 14 is urged by a turning spring (second force-applying member) 49 in a direction such as to open up the objective lens 9, and the turning of the lens barrier 14 in the direction of the force applied by the turning spring 49 is restricted by a barrier restricting member (second restricting member) 50 provided on the second lens barrel 8.

Moreover, in the lens barrel unit 6', the position detecting means 41 is a publicly known sensor that is constituted from a magnet 51 attached to the driving member 46, and a magnetic field detecting means 52 using a Hall element fixed to the frame 28; the position of the driving member 46 is calculated from the magnetic flux detected by the magnetic field detecting means 52.

Figure 14:
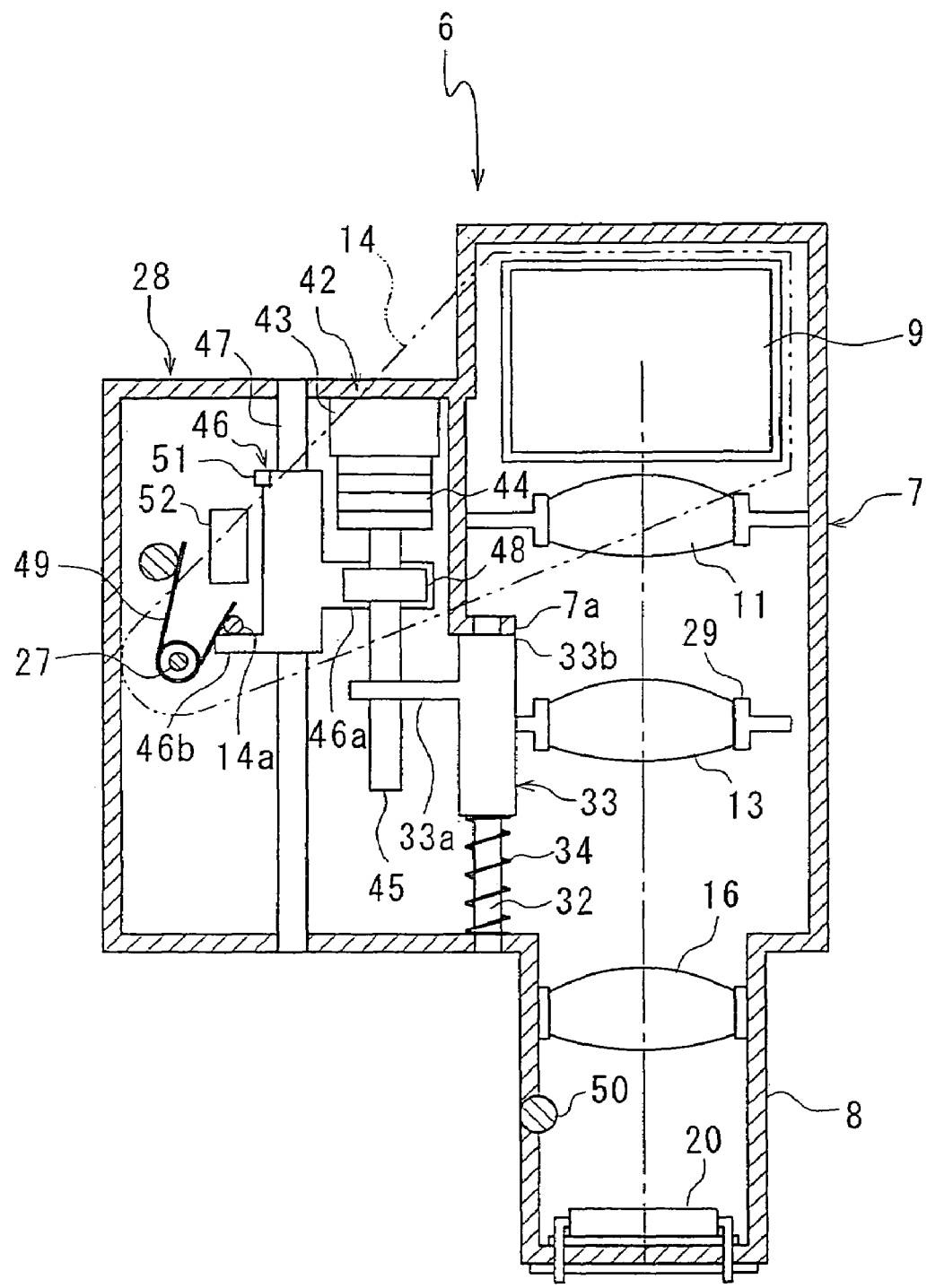
FIG. 14 is a view of the structure of a lens barrel unit according to a second embodiment of the present invention when not taking an image.
Figure 15:
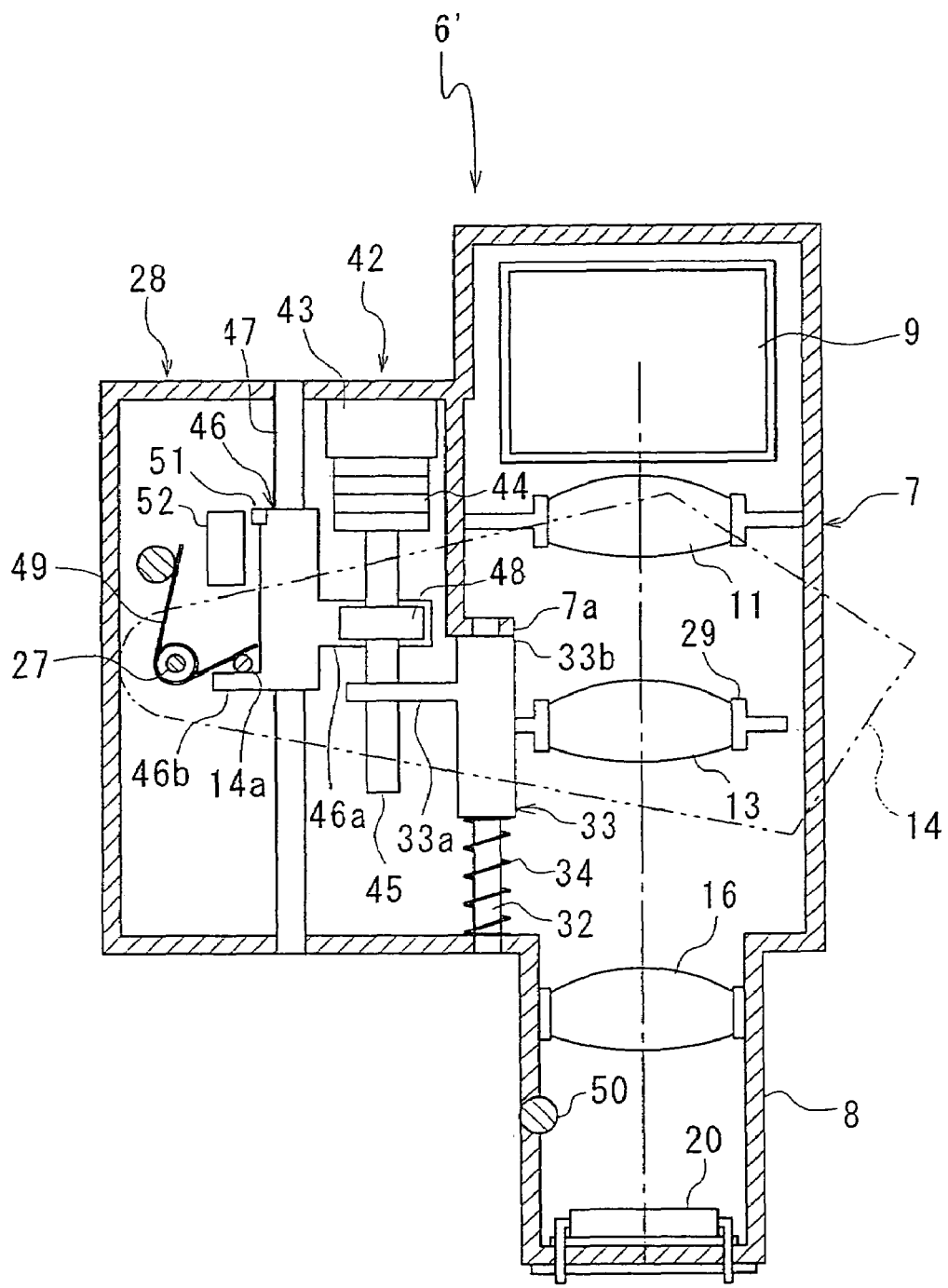
FIG. 15 is a view of the structure of the lens barrel unit shown in FIG. 14 during opening of a lens barrier.
Figure 16:
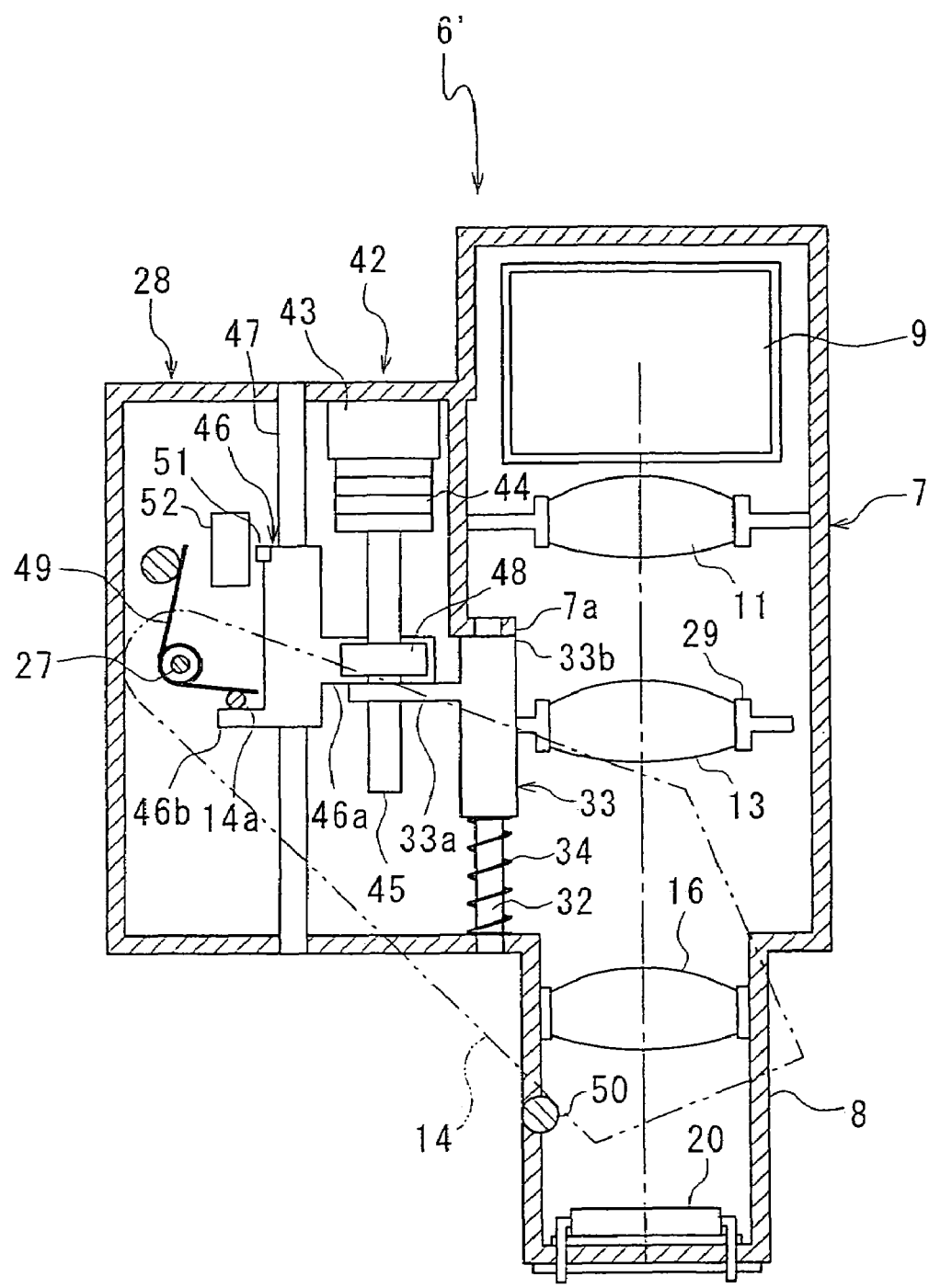
FIG. 16 is a view of the structure of the lens barrel unit shown in FIG. 14 at a wide extreme.
Figure 17:
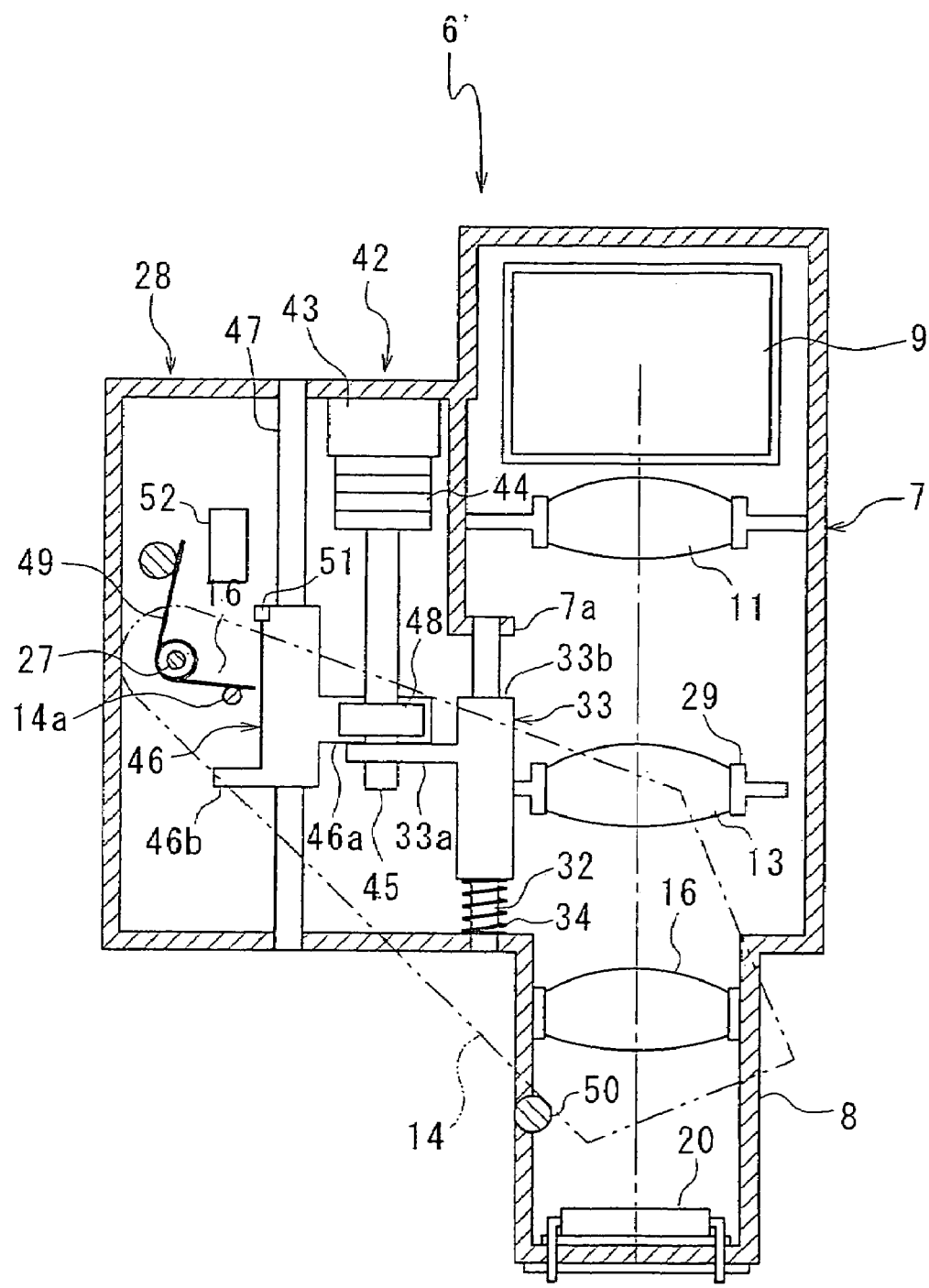
FIG. 17 is a view of the structure of the lens barrel unit shown in FIG. 14 at a telephoto extreme.

According to the lens barrel unit 6' of the present embodiment, as shown in FIG. 14, when not taking an image, the lens barrier 14 covers the objective lens 9. As shown in FIG. 15, upon the piezoelectric actuator 42 extending the piezoelectric element 44 so as to make the driving member 46 descend, the transmitting pin 14a is pushed against the driving piece 46b by the spring 49, and hence the lens barrier 14 turns following the linear movement of the driving member 46, thus opening up the objective lens 9. As shown in FIG. 16, upon the driving member 46 descending until the driving member 46 contacts the first moving member 33, the lens barrier 14 contacts the barrier restricting member 50. As shown in FIG. 17, upon the driving member 46 descending further, the lens barrier 14 is restricted by the barrier restricting member 50, and thus isolated from the driving member 46; on the other hand, the first moving member 33 descends together with the driving member 46, thus moving the second lens group 13 toward the telephoto extreme.

In the embodiments described above, the second moving member opens and closes the lens barrier 14; however, the second moving member may instead drive another constituent element, for example may make a flash unit project out from the main body 2.

Although the present invention has been fully described by way of the examples with reference to the accompanying drawing, it is to be noted that various changes and modifications will be apparent to those skilled in the art. Therefore, unless such changes and modifications otherwise depart from the spirit and scope of the present invention, they should be construed as being included therein.

What is claimed is:

1. A lens barrel unit comprising:
   an actuator for positioning a driving member that is linearly movable along a driving shaft;
   a first moving member which is movably supported and linked to a lens;
   a second moving member which is movably supported;
   a first force-applying member that applies a force to said first moving member in a direction so as to cause said first moving member to contact said driving member, thus causing said first moving member to follow linear movement of said driving member;
   a first restricting member that contacts said first moving member, thus limiting movement of said first moving member in the direction of the force applied by said first force-applying member, and hence isolating said first moving member from said driving member;
   a second force-applying member that applies a force to said second moving member in a direction so as to cause said second moving member to contact said driving member, thus causing said second moving member to follow linear movement of said driving member; and
   a second restricting member that contacts said second moving member, thus limiting movement of said second moving member in the direction of the force applied by said second force-applying member, and hence isolating said second moving member from said driving member, wherein
   the direction of the force applied by said first force-applying member and the direction of the force applied by said second force-applying member are opposite relative to said driving member.

2. The lens barrel unit according to claim 1, wherein said first restricting member and said second restricting member restrict respectively said first moving member and said second moving member such that said first moving member and said second moving member do not simultaneously contact said driving member.

3. The lens barrel unit according to claim 1, having a first sliding shaft that guides said first moving member parallel to said driving shaft.

4. The lens barrel unit according to claim 1, wherein
   said driving shaft is a rotatable driving screw having a screw thread provided at a periphery thereof,
   said driving member has an internal screw thread that engages with said driving screw, and
   said actuator comprises a motor that rotates said driving screw.

5. The lens barrel unit according to claim 1, wherein
   said actuator comprises an electromechanical converter that extends/contracts so as to cause said driving shaft to move in an axial direction, and
   said driving member engages through friction with said driving shaft so as to move together with said driving shaft when said driving shaft moves gradually, and slide over said driving shaft when said driving shaft moves suddenly.

6. The lens barrel unit according to claim 1, comprising position detecting means for detecting the position of at least one of said driving member, said first moving member and said second moving member.

7. The lens barrel unit according to claim 1, having an optical member that bends an optical axis substantially 90°.

8. An imaging apparatus having a lens barrel unit comprising:
- an actuator for positioning a driving member that is linearly movable along a driving shaft;
- a first moving member which is movably supported and linked to a lens;
- a second moving member which is movably supported;
- a first force-applying member that applies a force to said first moving member in a direction so as to cause said first moving member to contact said driving member, thus causing said first moving member to follow linear movement of said driving member;
- a first restricting member that contacts said first moving member, thus limiting movement of said first moving member in the direction of the force applied by said first force-applying member, and hence isolating said first moving member from said driving member;
- a second force-applying member that applies a force to said second moving member in a direction so as to cause said second moving member to contact said driving member, thus causing said second moving member to follow linear movement of said driving member; and
- a second restricting member that contacts said second moving member, thus limiting movement of said second moving member in the direction of the force applied by said second force-applying member, and hence isolating said second moving member from said driving member, wherein the direction of the force applied by said first force-applying member and the direction of the force applied by said second force-applying member are opposite relative to said driving member.

9. The imaging apparatus according to claim 8, wherein
said first moving member contacts said driving member when taking an image, and
said first moving member is isolated from said driving member when not taking an image.

10. The imaging apparatus according to claim 9, wherein said second moving member moves a lens barrier.

* * * * *